(12) United States Patent
Aiken et al.

(10) Patent No.: US 7,602,381 B2
(45) Date of Patent: Oct. 13, 2009

(54) HAND-HELD INTERACTIVE ELECTRONIC DEVICE

(75) Inventors: Brian L. Aiken, East Aurora, NY (US);
Erica Nissen, Buffalo, NY (US); Shanti Coleman, East Aurora, NY (US); Pete Reile, South Wales, NY (US); Justin Petit, Depew, NY (US); Travis Eckler, Brockport, NY (US)

(73) Assignee: Mattel, Inc., El Segundo, CA (US)

( * ) Notice: Subject to any disclaimer, the term of this patent is extended or adjusted under 35 U.S.C. 154(b) by 985 days.

(21) Appl. No.: 11/198,497

(22) Filed: Aug. 5, 2005

(65) Prior Publication Data

US 2006/0050061 A1    Mar. 9, 2006

Related U.S. Application Data

(63) Continuation of application No. PCT/US2004/004245, filed on Feb. 13, 2004.

(60) Provisional application No. 60/447,671, filed on Feb. 14, 2003.

(51) Int. Cl.
*G06F 3/041* (2006.01)

(52) U.S. Cl. ........................................ 345/173; 345/156

(58) Field of Classification Search ......... 345/156–173; 235/375, 487; 434/157, 167, 169, 201, 327
See application file for complete search history.

(56) References Cited

U.S. PATENT DOCUMENTS

| | | | |
|---|---|---|---|
| 4,359,222 A | 11/1982 | Smith, III et al. | |
| 4,884,974 A | 12/1989 | DeSmet | |
| 5,091,832 A | 2/1992 | Tortola et al. | |
| 5,219,291 A | 6/1993 | Fong et al. | |
| 5,379,057 A * | 1/1995 | Clough et al. | 345/173 |
| 5,404,442 A | 4/1995 | Foster et al. | |
| 5,466,158 A * | 11/1995 | Smith, III | 434/317 |
| 5,475,399 A | 12/1995 | Borsuk | |
| 5,485,176 A | 1/1996 | Ohara et al. | |
| 5,511,980 A | 4/1996 | Wood | |
| 5,517,407 A | 5/1996 | Weiner | |
| 5,579,487 A * | 11/1996 | Meyerson et al. | 710/100 |
| 5,636,995 A | 6/1997 | Sharpe, III et al. | |
| 5,648,760 A * | 7/1997 | Kumar | 340/825.25 |
| 5,670,992 A * | 9/1997 | Yasuhara et al. | 345/173 |
| 5,696,496 A * | 12/1997 | Kumar | 340/825.25 |
| 5,739,814 A * | 4/1998 | Ohara et al. | 345/173 |
| 5,761,485 A | 6/1998 | Munyan | |
| 5,813,861 A | 9/1998 | Wood | |

(Continued)

*Primary Examiner*—Nitin Patel
(74) *Attorney, Agent, or Firm*—Panitch Schwarze Belisario & Nadel LLP (57) ABSTRACT

A hand-held interactive electronic device has an electronic display with a touch screen. A plurality of icons is on the touch screen. A frame element separate from the touch screen bounds a portion of the touch screen. A plurality of indicia is on the frame element. Each indicium is in register with a corresponding icon on the touch screen. A processor is operatively coupled to the display. A fixed memory or a removable memory is operatively coupled to the processor. The memory stores instructions defining a plurality of functions. Each function is associated with a corresponding indicium on the frame element. The processor is configured to enable the function associated with the corresponding indicium upon selection of the icon registered with the corresponding indicium.

27 Claims, 6 Drawing Sheets

U.S. PATENT DOCUMENTS

| | | | |
|---|---|---|---|
| 5,839,902 A | 11/1998 | Wood | |
| 5,847,698 A * | 12/1998 | Reavey et al. | 345/173 |
| 5,851,119 A | 12/1998 | Sharpe, III et al. | |
| 5,865,677 A | 2/1999 | Goldfarb et al. | |
| 5,944,533 A | 8/1999 | Wood | |
| 5,945,656 A | 8/1999 | Lemelson et al. | |
| 5,991,594 A | 11/1999 | Froeber et al. | |
| 5,997,304 A | 12/1999 | Wood | |
| 6,005,545 A | 12/1999 | Nishida et al. | |
| 6,009,336 A | 12/1999 | Harris et al. | |
| 6,052,117 A | 4/2000 | Ohara et al. | |
| 6,052,279 A | 4/2000 | Friend et al. | |
| 6,064,855 A | 5/2000 | Ho | |
| 6,157,379 A | 12/2000 | Singh | |
| 6,191,777 B1 * | 2/2001 | Yasuhara et al. | 345/173 |
| 6,201,947 B1 | 3/2001 | Hur et al. | |
| 6,297,812 B1 | 10/2001 | Ohara et al. | |
| 6,314,474 B1 | 11/2001 | Walter et al. | |
| 6,356,255 B1 | 3/2002 | Weil et al. | |
| 6,411,275 B1 | 6/2002 | Hedberg | |
| 6,416,326 B1 * | 7/2002 | Oh | 434/178 |
| 6,437,836 B1 | 8/2002 | Huang et al. | |
| 6,491,630 B1 * | 12/2002 | Saccardo et al. | 600/437 |
| 6,530,838 B2 * | 3/2003 | Ha et al. | 463/36 |
| 6,556,184 B2 | 4/2003 | Weil et al. | |
| 6,608,618 B2 * | 8/2003 | Wood et al. | 345/173 |
| 6,639,577 B2 * | 10/2003 | Eberhard | 345/102 |
| 6,641,401 B2 | 11/2003 | Wood et al. | |
| 6,661,407 B2 | 12/2003 | Severson | |
| 6,859,197 B2 * | 2/2005 | Klein et al. | 345/158 |
| 6,882,824 B2 | 4/2005 | Wood | |
| 7,068,259 B2 * | 6/2006 | Kim et al. | 345/169 |
| 7,106,309 B2 * | 9/2006 | Wood et al. | 345/173 |
| 7,170,497 B2 * | 1/2007 | Husgafvel et al. | 345/172 |
| 7,256,988 B2 * | 8/2007 | Shimamoto et al. | 361/679.55 |
| 7,445,549 B1 * | 11/2008 | Best | 463/32 |
| 2001/0014623 A1 | 8/2001 | Kawai et al. | |
| 2001/0029203 A1 | 10/2001 | Shoji et al. | |
| 2001/0043194 A1 | 11/2001 | Amron | |
| 2002/0142471 A1 | 10/2002 | Handique et al. | |
| 2003/0017848 A1 | 1/2003 | Engstrom et al. | |
| 2003/0017856 A1 | 1/2003 | Kotchick et al. | |
| 2003/0073415 A1 | 4/2003 | Engstrom et al. | |

* cited by examiner

HAND-HELD INTERACTIVE ELECTRONIC DEVICE

CROSS-REFERENCE TO RELATED APPLICATIONS

This application is a continuation of International Application PCT/US2004/004245, filed Feb. 13, 2004 the disclosure of which is incorporated herein by reference and which is based upon U.S. Provisional Application No. 60/447,671, filed Feb. 14, 2003, now abandoned.

BACKGROUND OF THE INVENTION

The present invention relates to a hand-held interactive electronic device. More particularly, the present invention relates to an electronic device that is configured as a hand-held device with an electronic display that allows a user to engage in interactive, display-based gaming-styled activities having educational or amusement value to the user.

Conventional hand-held interactive electronic devices, such as electronic gaming devices and personal digital assistants, due to their intended use typically have relatively small, video displays, approximately twenty five to one-hundred square centimeters. In such devices, there is a premium placed on the use of the active area of the display. Accordingly, screen layouts for the active area generally allocate limited space for icons that a user may select to place the device in a particular mode of operation or to activate a specific function of the device. Typically, the icons are small unlabeled graphic images that the user must learn to associate with the corresponding function. Labels identifying the icons, if any, are provided permanently on the housing of the device, thereby limiting the number of modes of operation of the device or its functionality or are software generated pop-ups using additional display real estate.

Accordingly, there is a need for a hand-held electronic device that communicates to the user the identity of the modes of operation or functions associated with selectable icons appearing on the display without adversely affecting the utility of the device.

BRIEF SUMMARY OF THE INVENTION

Briefly stated, one embodiment of the present invention is directed to a hand-held interactive electronic device comprising an electronic display having a visible and user accessible touch screen. A plurality of icons is visible on the touch screen. A frame element separate from the touch screen bounds a portion of the touch screen. A plurality of indicia is on the frame element. Each indicium is in register with a corresponding icon on the touch screen. A processor is operatively coupled to the display. A memory is operatively coupled to the processor. The memory stores instructions defining a plurality of functions. Each function is associated with a corresponding indicium on the frame element. The processor is configured to enable the function associated with the corresponding indicium upon selection of the icon registered with the corresponding indicium.

Another embodiment of the present invention is directed to a hand-held interactive electronic device comprising a base unit having an electronic display. A processor is in the base unit. The processor is operatively coupled to the display. A memory is operatively coupled to the processor. The memory comprises fixed memory in the base unit and removable memory insertable in the base unit. A script is stored in the removable memory and is executable by the processor. A frame element separate from the touch screen bounds a portion of the touch screen. The frame element is connected to the removable memory. A graphic is on the frame element. The graphic is related to the script.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

As used in the claims and the corresponding portions of the following description, the word "a" means "at least one." Further, the word "or" has the meaning of a Boolean inclusive "Or". For example, the phrase "A or B" means "A" alone or "B" alone or both "A" and "B". Still further, unless otherwise defined the word "connected" as used in the claims and in corresponding portions of the specification means that there exists between any two or more elements a structural path, which may include additional elements not explicitly recited.

Referring to FIGS. 1-4, there is shown a first preferred embodiment of the hand-held interactive electronic device, generally designated 10, and hereinafter referred to as the "electronic device" 10 in accordance with the present invention. The electronic device 10 comprises a base unit 12 having an electronic display 14 with a touch screen 15 and an audio output, such as a speaker 16 or earphones (not shown). Preferably, the electronic display 14 is a liquid crystal display (LCD) based touch screen 15 generally having a rectangular or square shape with a transparent or substantially transparent visible and user accessible touch screen 15 located on a liquid crystal display array (not separately depicted or numbered). A processor 18 in the base unit 12 is operatively coupled to the display 14 and the speaker 16. An electronic memory 20 is operatively coupled to the processor 18. Preferably the electronic memory 20 comprises a fixed memory 22 in the base unit 12 and a removable memory 24 preferably housed in a cartridge 36 removably insertable in the base unit 12.

Figure 7:
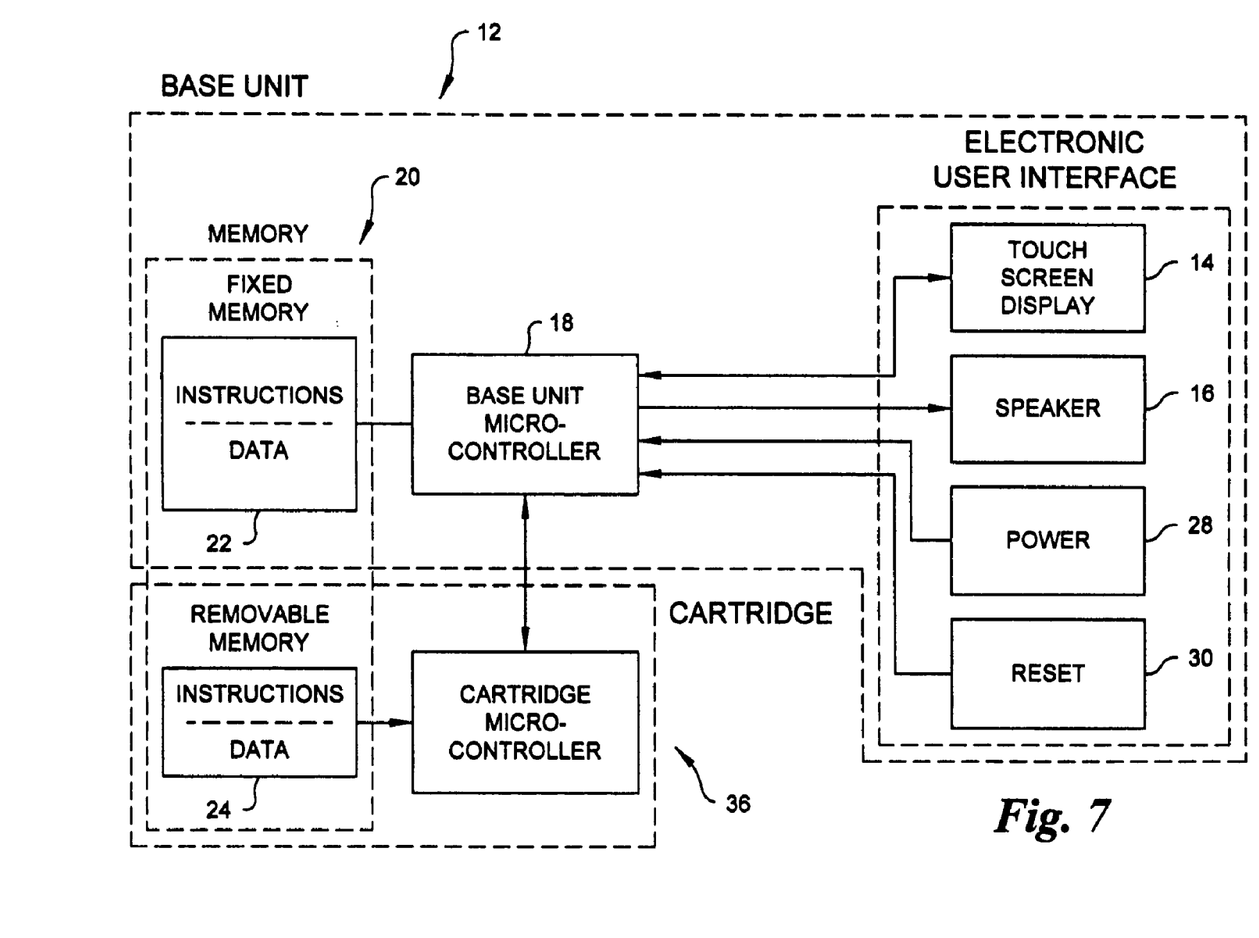
FIG. 7 is a block diagram of the system electronics for the and-held interactive electronic device of FIG. 1.

The processor 18, the electronic display 14 with the touch screen 15 and the memory 20 are shown in the block diagram of FIG. 7 and comprise system electronics substantially the same as the electronics disclosed in pending U.S. patent application Ser. No. 09/977,243 filed Oct. 16, 2001 and entitled "Hand-held Electronic Toy", the disclosure of which is hereby incorporated herein by reference. In general, the artisan will understand that the processor 18 can be any microprocessor able to drive and communicate with other components of the system electronics and also able to execute instructions and access data stored in the memory 20. Accordingly, with the exception of the user interface discussed below, for brevity, the system electronics for the electronic device 10 will not be further disclosed herein.

The base unit 12 has a generally rectangular shaped display mount 26 for receiving and surrounding the touch screen 15. Preferably the sidewalls 26a of the display mount 26 adjacent the touch screen 15 of the display 14 are slightly arcuate and are beveled upward as they extend away from the touch screen 15. A power switch 28 and a reset 30 are provided in the lower portion of the mount 26. A mechanical stylus 32 is tethered to the base unit 12 and is removably retainable in a stylus slot 34 (FIG. 3) in the base unit 12. Interaction between a user and the electronic device 10 is achieved by placing the stylus 32 in contact with the touch screen 15 in a manner appropriate for the touch screen involved and moving the stylus 32 as appropriate, in response to audio prompts, instructions appearing on the display 14 or at the will of the user. The interaction, including system responses, is under control of system and application software stored either in the fixed memory 22 in base unit 12 or in the removable memory 24 in the cartridge 36 removably insertable in the base unit 12.

A frame element 38 bounds at least a portion of the touch screen 15 and is removably coupled to the electronic display 14 through the display mount 26. Preferably, a frame 40 formed by a plurality of the frame elements 38 entirely surrounds the display 14 and the touch screen 15 and releasably couples the frame elements 38 with the electronic display 14 by a friction fit, snap fit or other known methods of removably connecting the frame 40 to the display mount 26. The base unit 12 could have been designed in a way to permit the frame 40 to couple directly to the display over the mount 26 by projecting the touch screen 15 above the mount 26.

Figures 3, 4:
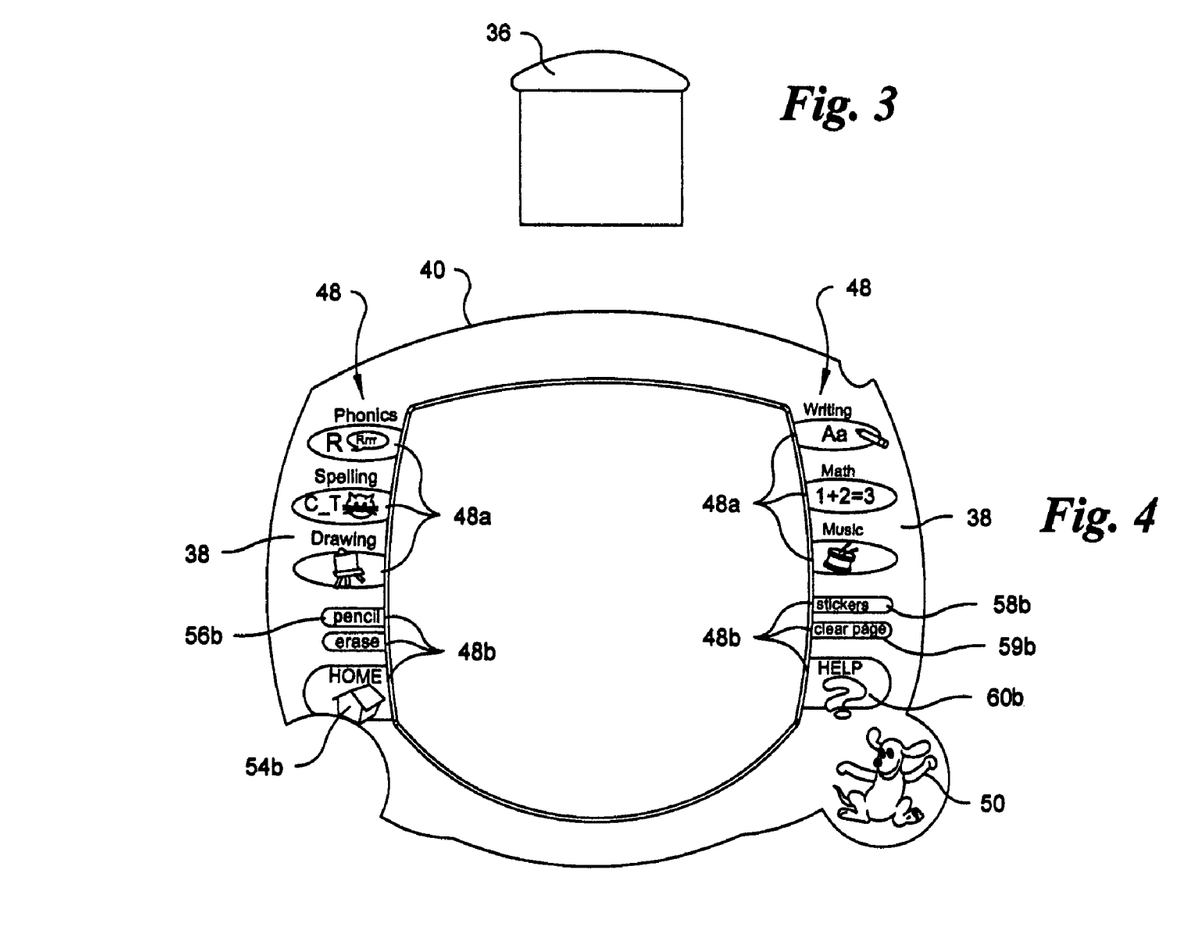
FIG. 3 is a top plan view of the removable cartridge of FIG. 1.
FIG. 4 is a top plan view of the frame of FIG. 1.
Figure 5:
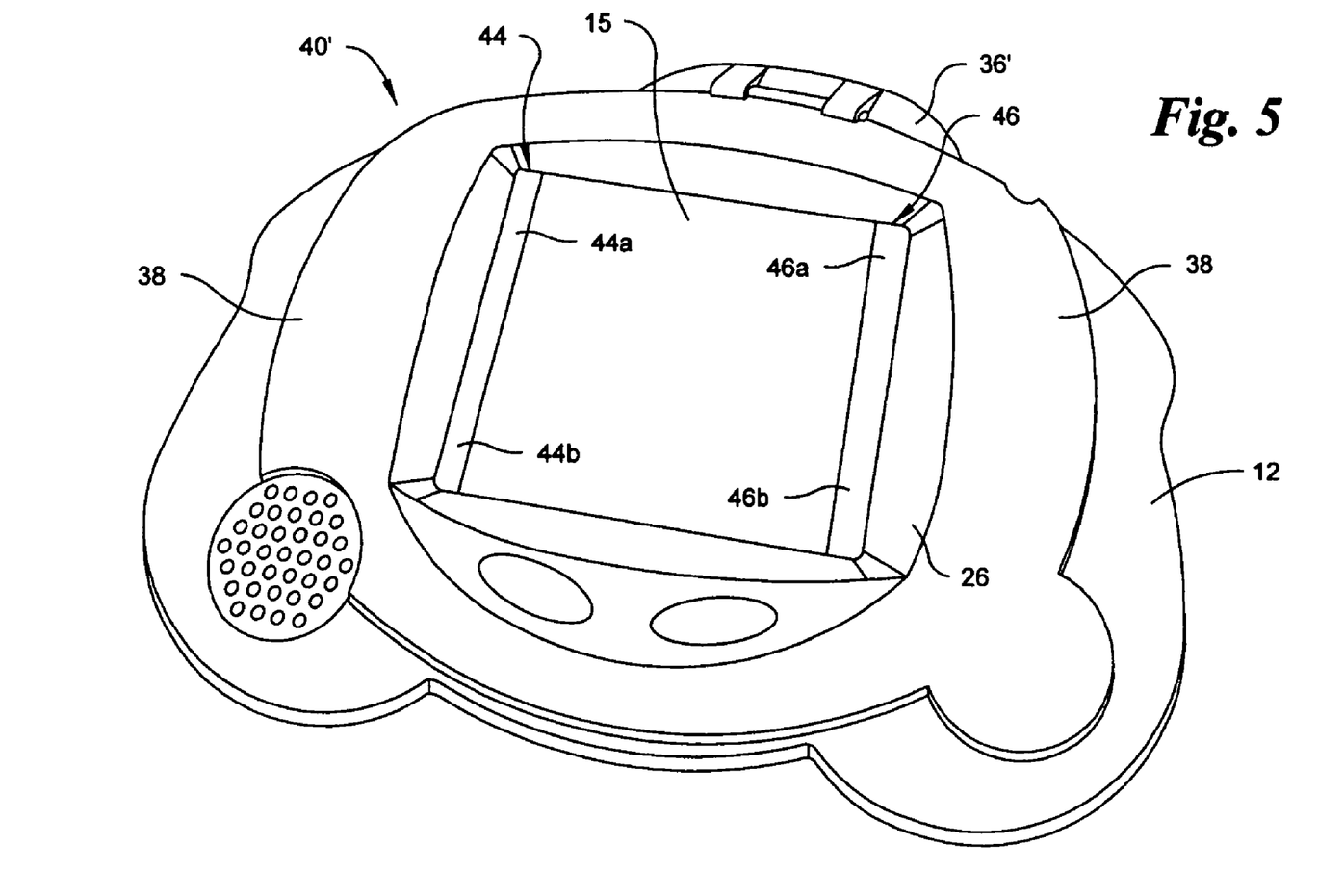
FIG. 5 is a top perspective view of the base unit of FIG. 1 with a second preferred embodiment of the frame and removable cartridge mounted to the base unit in accordance with the present invention.
Figure 6:
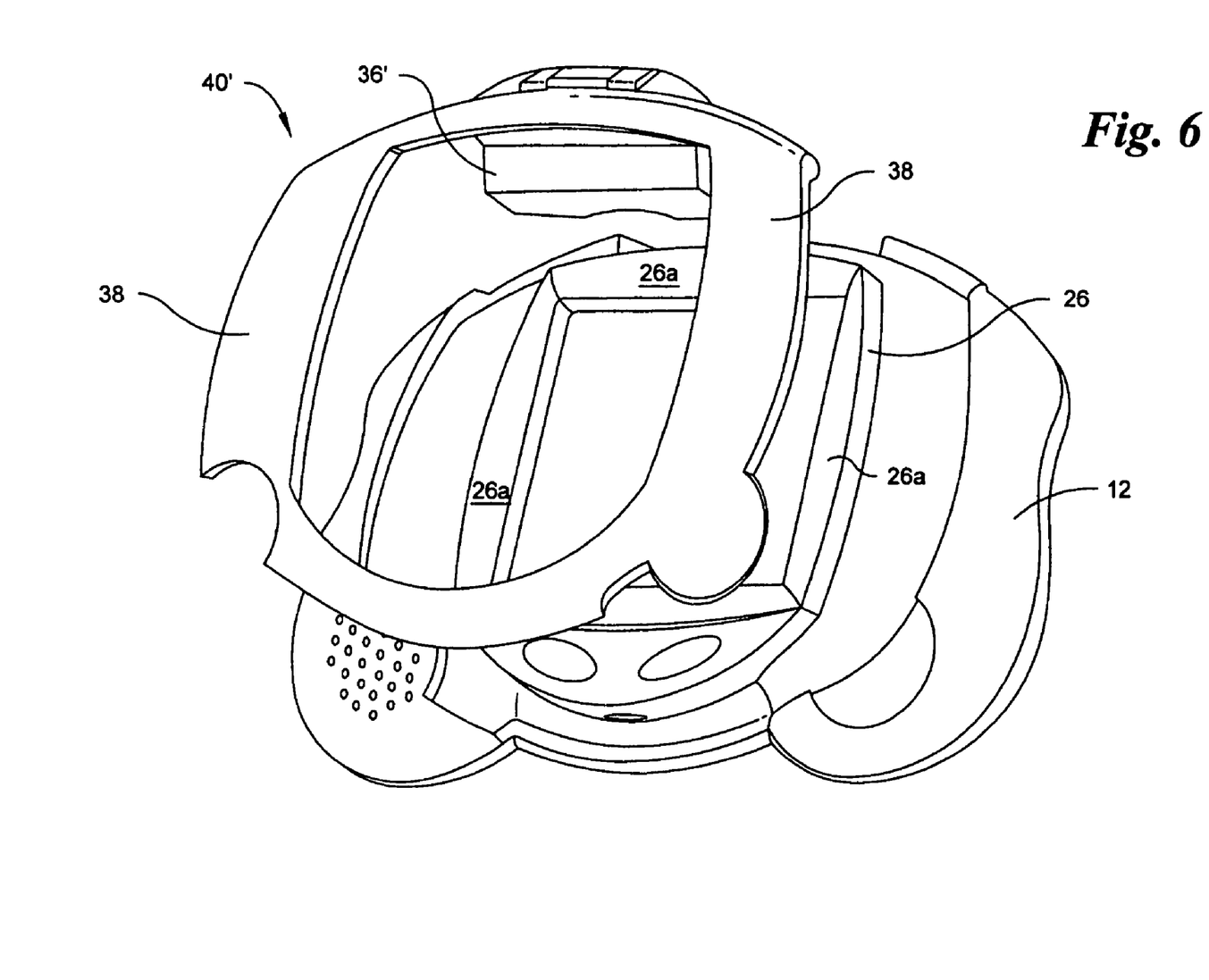
FIG. 6 is a top partially exploded perspective view of the hand-held interactive electronic device of FIG. 5.

Referring to FIGS. 4-5, another embodiment of a frame, generally designated 40', and hereinafter referred to as the frame 40', can be used with the base unit 12 of the present invention. The frame 40' is also formed by a plurality of the frame elements 38. The frame 40' is different from the first embodiment frame 40 and cartridge 35 in that the frame 40' is connected to removable cartridge 36' having therein the removable memory 24. Preferably, the frame 40' is pivotably connected to the removable cartridge 36'. The frame 40' and the removable cartridge 36' are configured to enable the frame 40' to entirely surround the touch screen 15 when the removable cartridge 36' is inserted in the base unit 12 and the removable memory 24 is operatively coupled with the processor 18.

A plurality of icons 42 are provided on the touch screen 15 of the display 14. The plurality of icons 42 may be permanently provided on the touch screen 15, such as by printing on, in, or under the touch screen 15, each icon 42 being in a fixed position. Alternatively, the processor 18 may cause at least one icon of the plurality of icons 42 to appear and be visible on the touch screen 15 by generating the icon on the underlying liquid crystal array. Preferably, the icons 42 of the plurality, whether permanently on the touch screen 15 or caused to appear on the touch screen 15 by the processor 18, are positioned in a spaced-apart relationship in at least one of the margins 44, 46 of the touch screen 15. The plurality of icons 42 are selectable by the stylus 32 or a user's finger (not shown).

Each icon of the plurality of icons 42 may have various attributes. For example, each icon may have a unique color. Alternatively, the plurality of icons 42 may comprise a first group 42a of icons, each icon of the first group 42a having a unique color and the same geometric shape with the same orientation, such as a generally triangular shape with a vertex oriented toward a corresponding indicium 48a of the plurality of indicia 48 discussed below, and a second group 42b of icons, each icon of the second group 42b having a graphic unique with respect to other graphics of the electronic device 10.

The plurality of icons 42 also may be arranged on the touch screen 15 in various ways. For example, referring to FIG. 2, the plurality of icons 42 may be arranged in the first margin 44 of the touch screen 15 and in a second margin 46 in an opposed and spaced-apart relationship with the first margin 44 such that each icon of the first group 42a is fixed in position in a spaced-apart relationship in a first portion 44a, 46a of the first and second margins 44, 46 and, each icon of the second group 42b is fixed in position in a spaced-apart relationship in a second portion 44b, 46b of the first and second margins 44, 46. Alternatively, the plurality of icons 42 may be arranged in the first margin 44 of the touch screen 15 such that each icon of the first group 42a is fixed in position in a spaced-apart relationship in a first portion 44a of the first margin 44, and each icon of the second group 44b is fixed in position in a spaced-apart relationship in a second portion 44b of the first margin 44.

The electronic memory 20 stores instructions defining a plurality of functions discussed below. Each function is associated with a corresponding indicium 48a, 48b of the plurality of indicia 48 on the frame element 38. Each indicium is in register with a corresponding icon of the plurality of icons 42 on the touch screen 15 as 58b, 59b, 60b are with 58a, 59a, 60a, respectively. The processor 18 is configured to enable the function associated with the corresponding indicium 48a, 48b upon selection of the icon 42 registered with the corresponding indicium 48. The processor 18 is also configured to execute a script stored in the removable memory 24. The script can also be stored in the fixed memory 22 in the base unit 12. Upon execution by the processor 18, the script provides a plurality of script-based activities for interactively engaging the user. In addition to the plurality of indicia 48, a graphic of a character 50, such as the dog Max, in the script or a theme related to the script can be provided on the frame element 38 for aesthetics and to enable the user to more easily identify particular frames. An identical or similar graphic can be provided on the cartridge 36 that accompanies the frame 40 to more easily identify the pair.

Preferably, the plurality of functions comprises a first set of functions and a second set of functions. Each function of the first set is associated with a corresponding script-based activity of a plurality of available script-based activities, such as letter writing/recognition or other academic and creative learning skill activities discussed below. Each function of the second set can be permanently associated with the corresponding icon 42 and with one tool of a plurality of tools, such as a pencil tool or an erase tool, among other tools also discussed below.

Figure 1:
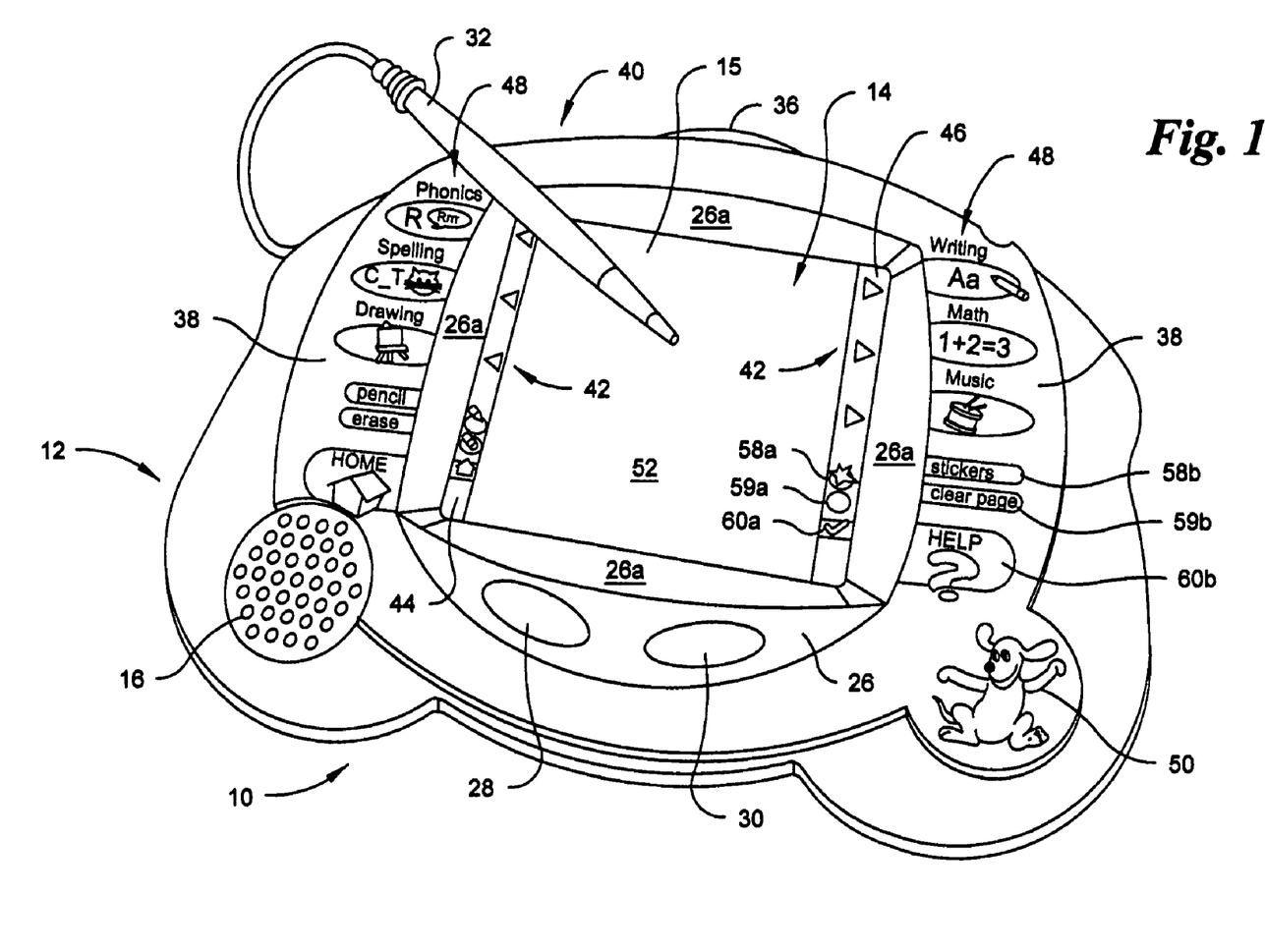
FIG. 1 is a top perspective view of a first preferred embodiment of a hand-held interactive electronic device in accordance with the present invention.
Figure 2:
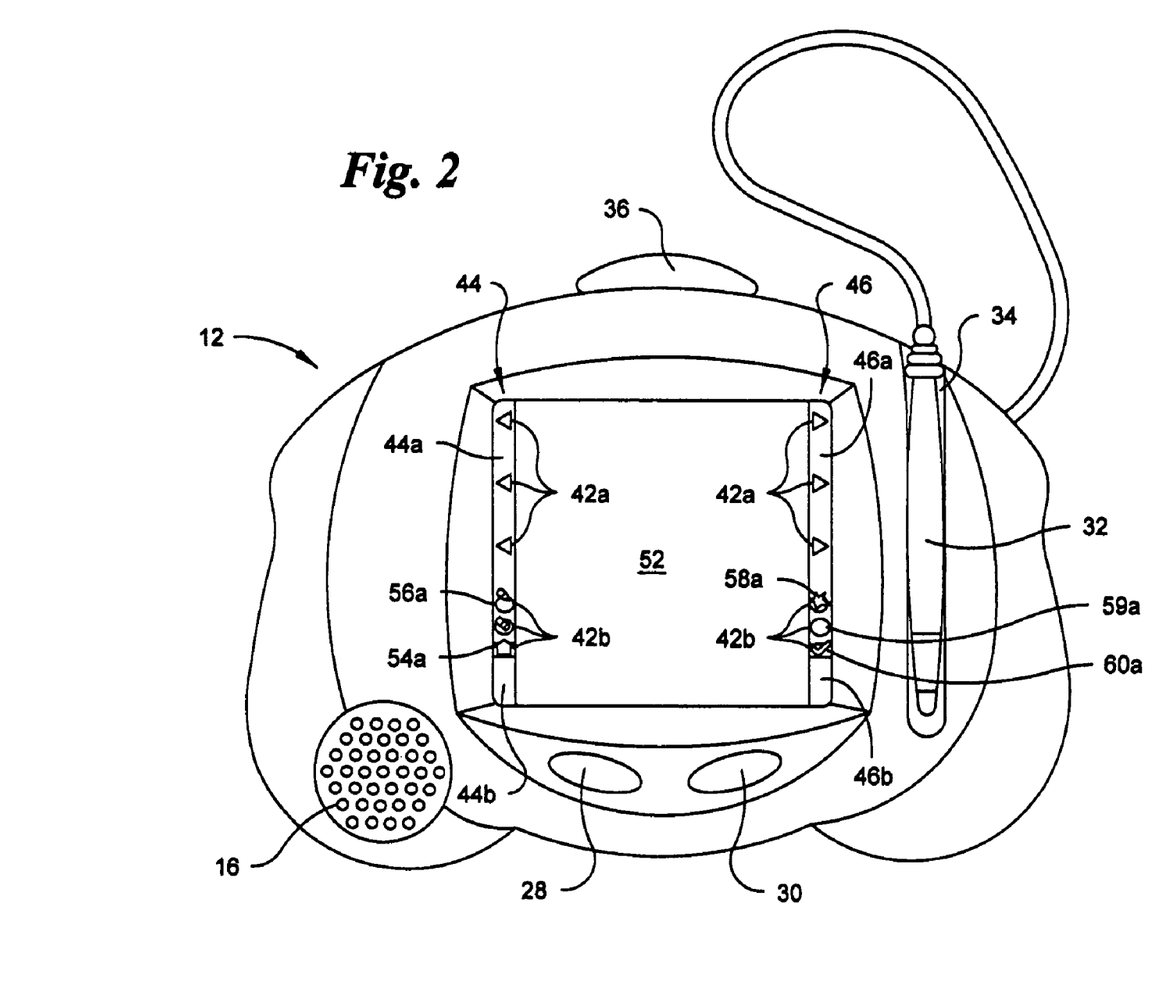
FIG. 2 is a top plan view of the base unit of FIG. 1.

Referring to FIG. 1, the first group 42a of the plurality of icons 42 comprises an arrangement of six icons having substantially the same generally triangular shape. Three icons of the six icons are fixed in location in the first portion 44a of the first margin 44 of the touch screen 15 and the remaining three icons of the six icons are fixed in location in the first portion 46a of the second margin 46 of the touch screen 15. Each of the triangular-shaped icons of the first group 42a has a unique color and a vertex oriented toward the corresponding indicium 48a on the frame element 38. Preferably, the function corresponding to each of the icons of the first group 42a is predetermined by software in the removable memory 24 in the cartridge 36 insertable in the base unit 12. Alternatively, the software defining one or more of the corresponding functions can be stored in the fixed memory 22 in the base unit 12. The indicia 48a corresponding to the icons of the first group 42a on the frame element 38 are also predetermined.

In the preferred embodiment of the electronic device in FIG. 1, the predetermined functions are phonics, writing, spelling, math, drawing, and music and the corresponding indicia 48a are similarly named and include a graphic representative of the assigned function. As the following examples disclose, each of the predetermined functions corresponding to an icon of the first group 42a of the plurality of icons 42 is directed to a script-based activity introducing the user to an academic or creative learning skill and having as a central character a dog named Max.

The phonics function introduces the user to letter sounds in the context of a scripted, processor-executable game, such as Phonics Jumper in which the object of the game is to guide a dog named Max across a river by making Max jump from one raft to another subject to the constraint that the jump must be on to rafts with objects starting with the same sound as a letter in a letter block on the other side of the river. The user touches Max or the next raft with the stylus to make Max jump from one raft to the next and finally onto the other side of the river. If the user touches a raft with an object starting with an incorrect letter sound, Max jumps into the water instead of onto the raft and reappears back in the previous jumping spot.

The writing function introduces the user to letter writing recognition using the well known Zaner-Bloser method in the context of a scripted, processor-executable game such as Writing Chase in which the user practices letter writing by tracing a dotted line representation of the letter produced on the touch screen or the underlying liquid crystal array by a flea. Upon activating the writing function by selecting the corresponding icon, the processor causes the following scripted interaction to occur. First a letter selection screen having a plurality of selectable letter blocks appears on the touch screen. After the user selects with a stylus touch the desired letter to be practiced, a writing screen appears with the chosen letter block located in the top left corner. An image that represents the letter and a word starting with the chosen letter appear at the bottom of the screen. Max comes running onto the screen and stops to scratch off a flea. The flashing flea hops off Max and onto the top writing line on the writing screen. Max looks up at the flea and barks at it before running off the screen. If the user touches the letter block with the stylus 32, the name of the letter is output and an animation shows how the letter is properly written using the Zaner-Bloser style of writing. If the user touches the flea with the stylus 32, the flea begins to animate and lay out a dotted-lines representation of the pen strokes for writing a letter for the user to trace with the stylus. When the flea finishes the layout, the flea waits at the end of the last stroke for a predetermined period of time, such as 5 seconds, for user input before re-tracing the lines. If the user traces the letter correctly and catches the flea waiting at the end of the last stroke, the user is rewarded with an encouraging phrase or sound effect.

The spelling function introduces the user to the spelling of three to five letter words in the context of a scripted, processor-executable game such as Spelling Bones in which the object of the game is to fill in one or two missing letters in a word appearing on the touch screen by using the stylus 32 to select from a plurality of bones also appearing on the touch screen, the bone or bones having the missing letter or letters. The math, drawing, and music functions also introduce the user to learning experiences in the context of scripted, interactive processor-executable games which, for brevity, are not disclosed herein, as the artisan will understand from the present disclosure that a wide variety of interactive entertainment or learning activities or both can be scripted and assigned to the first group 42a of the plurality of icons 42 without departing from the spirit and scope of the present invention.

Referring again to FIG. 2, in a preferred embodiment of the electronic device 10 the second group 42b of the plurality of icons 42 forms an other arrangement of six icons. Three icons of the other arrangement of six icons are fixed in location in the second portion 44b of the first margin 44 of the touch screen 15 and have the permanently assigned functions or tools "Home", "Erase", and "Pencil", respectively. The remaining three icons icons of the other arrangement of six icons are fixed in location in the second portion 46b of the second margin 46 of the touch screen 15 where they are numbered consecutively 58a, 59a, 60a and have the permanently assigned functions or tools, "Stickers", "Clear Page", and "Help", respectively. The instructions defining each of the functions associated with the second group 42b of the plurality of icons 42 are stored in the fixed memory 22 in the base unit 12.

Each icon of the second group 42b is a graphic representation of the corresponding function. The corresponding indicium 48b on the frame element 38 (FIGS. 1 and 4) in register with each icon of the second group of icons 42b identifies the corresponding function by name or an illustration representing the functionality of the function or both. For example, one of the icons is a home icon 54a to which the "Home" function corresponds is a graphic representing a side elevation view of a house and the corresponding home indicium 54b is the word "Home" in combination with a graphic above the word "Home" of a top perspective view of a house. The "Pencil" function provides an example in which the corresponding pencil icon 56a is a graphic of the pointed, writing end of a lead pencil and the corresponding pencil indicium 56b is the word "Pencil" without an accompanying graphic.

Selection of the "Home" function by touching the home icon 54a with the stylus 32 causes the processor 18 to produce in an active area 52 of the display 14, a "Home Screen" (not shown) having a plurality of selectable sub-functions and associated processor generated icons (not shown), such as a "save folder" image, a "retrieve folder" image, a "name field", a "volume button", a "music button", and a "top score button". The attributes of these sub-functions are shown in Table 1 below.

TABLE 1

HOME SCREEN save folder--when the user selects the "save folder" image on the home screen the last touch screen is saved.
retrieve folder--when the user selects the "retrieve folder" image on the home screen the last screen saved is shown.
entering name--the user can personalize the electronic device by entering a user name. To enter a name the user clicks in the name field provided at the top of the Home screen. A keyboard pops up at the bottom of the Home screen. When the new name is entered correctly, upon selecting the enter key, the keyboard disappears and the new name is saved.
volume--the user can change the volume level by selecting the volume button at the bottom of the home screen. When the volume button is selected a volume adjustment box pops up on the touch screen. The user selects the new TABLE 1-continued

HOME SCREEN volume level then selects the "x" to
close the box.
music--the user can choose to turn on or off
background music while using the electronic
device. The default is music ON. When the
music button is selected a music adjustment
box pops up on the touch screen. The user
selects music on/off then touches the "x"
to close the box.
top score--the user can view the top scores
from all the games When the top score
button is selected the top score page
appears and list the games and the scores.
The user can reset the top score on any
game by selecting the clear icon next to
the score.

The "Pencil" function provides for free-form drawing and allows the user to use the stylus 32 to draw on the electronic display 14 a single pixel-width line. In the preferred embodiment of the invention, the "Pencil" function is the default function. The "Erase" function de-activates pixels as the stylus 32 passes over them. "Screen Page" clears all user marks made on the electronic display 14. "Help" calls up a character associated with the current activity to help the user and provides guidance that is situation and activity dependent.

Selection of the "Sticker" function with a stylus touch to the sticker icon 58a causes a sticker selection screen (not shown) to appear in the active area 52 of the display 14. Selecting the sticker icon 58a allows the user to choose among a plurality of different sticker images. Once the user selects the desired sticker, the user is taken back to the last screen where the sticker image can be applied digitally anywhere and as many times as wanted. Each activity within a script can be bookmarked with specific stickers. Preferably, the stickers used as bookmarks appear first in a sticker pop-up menu presenting the plurality of selectable stickers.

Those skilled in the art will understand from the aforementioned disclosure that the configuration and number of icons 42 on the touch screen 15, the correspondence of specific functionality to each icon 42 as determined by the software stored in either the fixed or removable memory 22, 24, and the indicia 42 on the frame elements 38 corresponding to the specific functionality are not limiting and may depend on the subject matter and the entertainment, amusement or learning objectives scripted in the software. The artisan will also understand that a plurality of removable frames 40 and corresponding removable memory 24 providing a wide variety of scripted, processor-executable games may be used with the base unit 12 of the present invention and provide the electronic device 10 with a wide range of functionality without departing from the scope and spirit of the invention.

Further, those skilled in the art will appreciated that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A hand-held interactive electronic device, comprising:
an electronic display having a visible and user accessible touch screen;
a plurality of icons visible on the touch screen;
a frame element separate from the touch screen, the frame element bounding a portion of the touch screen;
a plurality of indicia on the frame element, each indicium being in register with a corresponding icon on the touch screen;
a processor operatively coupled to the display; and
a memory operatively coupled to the processor, the memory storing instructions defining a plurality of functions, each function being associated with a corresponding indicium on the frame element,
wherein the processor is configured to enable the function associated with the corresponding indicium upon selection of the icon registered with the corresponding indicium.

2. The hand-held interactive electronic device according to claim 1, wherein the processor causes at least one icon of the plurality of icons to appear on the touch screen.

3. The hand-held interactive electronic device according to claim 1, wherein the icons of the plurality of icons are positioned in a spaced-apart relationship in at least one margin of the touch screen.

4. The hand-held interactive electronic device according to claim 1, wherein each icon of the plurality of icons is fixed in position.

5. The hand-held interactive electronic device according to claim 1, wherein each icon of the plurality of icons has a unique color.

6. The hand-held interactive electronic device according to claim 1, wherein the plurality of icons comprises a first group of icons and a second group of icons, each icon of the first group having a unique color and the same geometric shape, each icon of the second group having a graphic unique with respect to other graphics of the device.

7. The hand-held interactive electronic device according to claim 1, wherein the touch screen has a generally rectangular shape and a first margin, and each icon of the plurality of icons is fixed in position in a spaced-apart relationship in the first margin.

8. The hand-held interactive electronic device according to claim 1, wherein the display and the touch screen have a generally rectangular shape and a first margin, and the plurality of icons comprises a first group of icons and a second group of icons, each icon of the first group being fixed in position in a spaced-apart relationship in a first portion of the first margin and having a generally triangular shape, each icon of the second group being fixed in position in a spaced-apart relationship in a second portion of the first margin and having a graphic unique with respect to other graphics of the device.

9. The hand-held interactive device according to claim 8, wherein each icon of the first group has a vertex oriented toward the corresponding indicium.

10. The hand-held interactive device according to claim 8, wherein the rectangular shape is a square.

11. The hand-held interactive electronic device according to claim 1, wherein the touch screen has a generally rectangular shape, a first margin and a second margin in an opposed and spaced-apart relationship with the first margin, a frame formed by a plurality of the frame elements encloses the touch screen, and the plurality of icons comprises a first group of icons and a second group of icons, each icon of the first group being fixed in position in a spaced-apart relationship in a first portion of the first or second margins and having a generally triangular shape with a vertex oriented toward the corresponding indicium, each icon of the second group being fixed in position in a spaced-apart relationship in a second portion of the first or second margins and having a graphic unique with respect to other graphics of the device.

12. The hand-held interactive electronic device according to claim 1, wherein each of the plurality of icons is selectable by a stylus.

13. The hand-held interactive electronic device according to claim 1, wherein each of the plurality of icons is selectable by a finger.

14. The hand-held interactive electronic device according to claim 1, wherein the frame element is removably coupled to the display.

15. The hand-held interactive electronic device according to claim 1, wherein the memory comprises fixed memory and removable memory, and the frame element is connected to the removable memory.

16. The hand-held interactive electronic device according to claim 15, wherein a script executable by the processor is stored in the removable memory, and wherein at least one of the indicia on the frame element is a graphic related to the script.

17. The hand-held interactive electronic device according to claim 1, wherein the plurality of functions comprises a first set of functions and a second set of functions, each function of the first set being permanently associated with the corresponding icon and with one tool of a plurality of tools.

18. The hand-held interactive electronic device according to claim 17, wherein the plurality of tools comprises a pencil tool and an erase tool.

19. The hand-held interactive electronic device according to claim 1, wherein the plurality of functions comprises a first set of functions and a second set of functions, and a script executable by the processor is stored in the memory, the script providing a plurality of script-based activities, each function of the second set being associated with a corresponding script-based activity of a plurality of script-based activities.

20. The hand-held interactive electronic device according to claim 19 wherein the plurality of script-based activities comprises letter writing recognition.

21. The hand-held interactive electronic device according to claim 1, wherein the plurality of functions comprises a first set of functions and a second set of functions, and a script executable by the processor is stored in the memory, the script providing a plurality of script-based activities, each function of the first set being permanently associated with the corresponding icon and with one tool of a plurality of tools, each function of the second set being associated with a corresponding script-based activity.

22. The hand-held interactive electronic device according to claim 21, wherein the memory comprises fixed memory and removable memory, the instructions defining the first set of functions being stored in the fixed memory, the instructions defining the second set of functions being stored in the removable memory.

23. A hand-held interactive electronic device, comprising:
- a base unit having an electronic display;
- a processor in the base unit, the processor operatively coupled to the display; and
- a memory operatively coupled to the processor, the memory comprising fixed memory in the base unit and removable memory insertable in the base unit;
- a script stored in the removable memory and executable by the processor;
- a frame element separate from the touch screen, the frame element bounding a portion of the touch screen, the frame element connected to the removable memory; and
- a graphic on the frame element, the graphic related to the script.

24. A hand-held interactive electronic device, according to claim 23, wherein the electronic display has a touch screen bounded by the frame element; and the electronic device further comprises:
- a plurality of icons on the touch screen;
- a plurality of indicia on the frame element, each indicium being in register with a corresponding icon on the touch screen;
- instructions defining a plurality of functions stored in the memory, each function being associated with a corresponding indicium on the frame element
- wherein the processor is configured to enable the function associated with the corresponding indicium upon selection of the icon registered with the corresponding indicium.

25. The hand-held interactive electronic device according to claim 24, wherein the script provides a plurality of script-based activities, the plurality of functions comprises a first set of functions and a second set of functions, each function of the first set being permanently associated with the corresponding icon and with one tool of a plurality of tools, each function of the second set being associated with a corresponding script-based activity of the plurality of script-based activities.

26. The hand-held interactive electronic device according to claim 24, wherein the plurality of icons are selected by a stylus or a finger.

27. The hand-held interactive electronic device according to claim 26, wherein the stylus is removable retainable in a stylus slot in the base unit.

* * * * *